United States Patent
Allen et al.

(10) Patent No.: US 9,580,114 B2
(45) Date of Patent: Feb. 28, 2017

(54) CLIP AND COUPLING ASSEMBLY

(71) Applicant: GM GLOBAL TECHNOLOGY OPERATIONS LLC, Detroit, MI (US)

(72) Inventors: Todd E. Allen, Lake Orion, MI (US); Seung H. Lee, Troy, MI (US); Paul W. Kenyon, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 14/656,884

(22) Filed: Mar. 13, 2015

(65) Prior Publication Data
US 2016/0264188 A1 Sep. 15, 2016

(51) Int. Cl.
| | |
|---|---|
| *B62D 27/00* | (2006.01) |
| *B62D 27/02* | (2006.01) |
| *F16B 2/22* | (2006.01) |
| *B62D 25/00* | (2006.01) |

(52) U.S. Cl.
CPC ............... *B62D 27/02* (2013.01); *B62D 25/00* (2013.01); *F16B 2/22* (2013.01)

(58) Field of Classification Search
CPC ............ B62D 27/02; B62D 25/00; F16B 2/22
See application file for complete search history.

(56) References Cited

U.S. PATENT DOCUMENTS

| | | | | |
|---|---|---|---|---|
| 3,310,929 | A | * | 3/1967 | Garvey ................... B60R 13/04 24/295 |
| 5,636,891 | A | * | 6/1997 | Van Order ............. B60N 3/026 224/313 |
| 5,992,914 | A | * | 11/1999 | Gotoh ................. B60R 13/0206 280/751 |
| 6,857,168 | B2 | * | 2/2005 | Lubera ................... B60N 3/026 24/293 |
| 2011/0067206 | A1 | * | 3/2011 | Senakiewich, II .... B60R 13/025 24/289 |

* cited by examiner

*Primary Examiner* — Lori L Lyjak
(74) *Attorney, Agent, or Firm* — Quinn Law Group

(57) ABSTRACT

A coupling assembly includes a panel and a clip. The panel has a panel hole, and the clip is partly inserted through the panel hole. The clip is a one-way clip because, once it is partly inserted through the panel hole, it cannot be decoupled from the panel. In an embodiment, the clip includes a clip base and a plurality of retainers coupled along the clip base. Once the coupling assembly is fully assembled, the retainers extend through the panel hole. Each retainer includes a frame coupled to the clip base and an overhang rotatably coupled to the frame. Each retainer also includes a restrictor coupled to the overhang. The restrictor can rotate relative to the frame between a first restrictor position and a second restrictor position. In the second restrictor position, the restrictor inhibits the clip from decoupling from the panel.

20 Claims, 2 Drawing Sheets

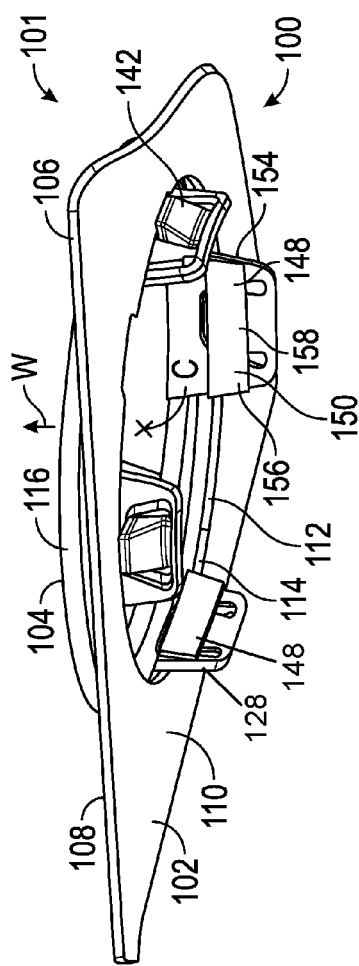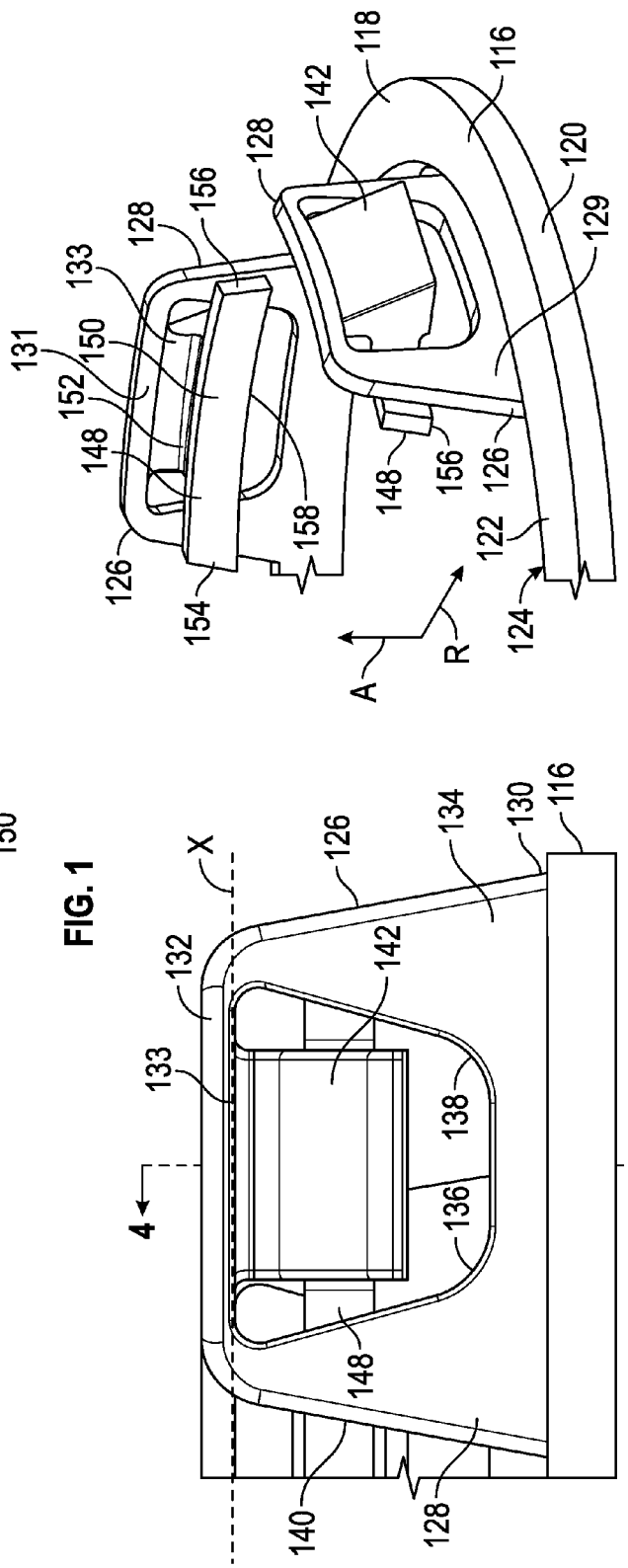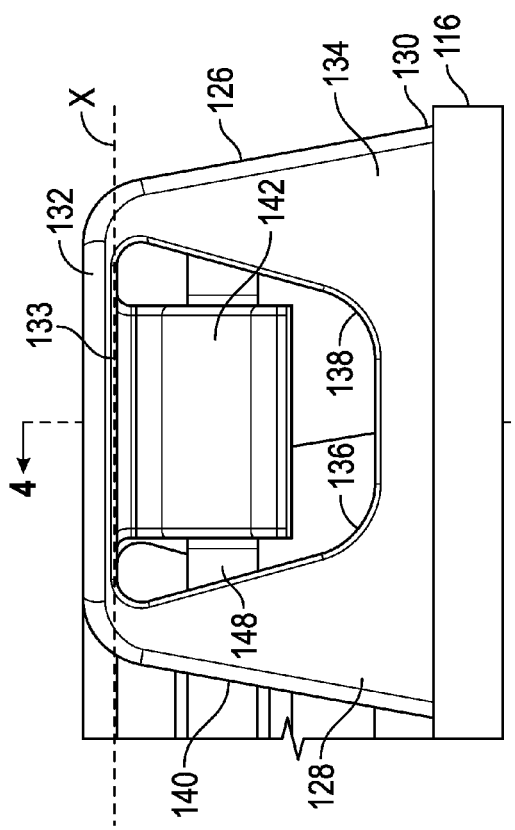

US 9,580,114 B2

CLIP AND COUPLING ASSEMBLY

TECHNICAL FIELD

The present disclosure relates to a clip and a coupling assembly including the clip.

BACKGROUND

Sheets of material may be attached to panels of a vehicle. Clips are used to secure the sheets of material to the vehicle. The retention clips engage both the sheet of material and the panel of the vehicle. The clips are configured to prevent rattling between the sheet of material and the panel. Further, the clips are configured to be installed onto the vehicle using as little insertion force as possible, while requiring a large force to remove the retention clip.

SUMMARY

The present disclosure describes a coupling assembly including a panel and a clip. The panel has a panel hole, and the clip is partly inserted through the panel hole. The clip is a one-way clip because, once it is partly inserted through the panel hole, it cannot be decoupled from the panel. In an embodiment, the clip includes a clip base and a plurality of retainers coupled along the clip base. Once the coupling assembly is fully assembled, the retainers extend through the panel hole. Each retainer includes a frame coupled to the clip base. The frame defines a first end portion and a second end portion opposite the first end portion. The first end portion of the frame is coupled to the clip base, and the second end portion of the frame defines an axis of rotation. Each retainer further includes an overhang rotatably coupled to the second end portion of the frame. As such, the overhang can rotate relative to the frame about the axis of rotation defined along the second end portion of the frame. Each retainer also includes a restrictor coupled to the overhang. The restrictor can rotate relative to the frame between a first restrictor position and a second restrictor position. In the first restrictor position, the restrictor is spaced apart from the frame. In the second restrictor position, the restrictor is in direct contact with the frame. The restrictor can move from the first restrictor position to the second restrictor position when a withdrawal force is applied to the clip. Once in the second restrictor position, the restrictor contacts the frame in order to inhibit rotation of the overhang relative to the frame, thereby inhibiting the clip from decoupling from the panel. The present disclosure also describes vehicles including the coupling assembly described above.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, perspective view of a coupling assembly including a panel and a clip partially inserted through the panel;

FIG. 2 is a schematic, perspective, fragmentary view of the clip shown in FIG. 1;

FIG. 3 is a schematic, front, fragmentary view of the clip shown in FIG. 1;

DETAILED DESCRIPTION

Figure 4A:
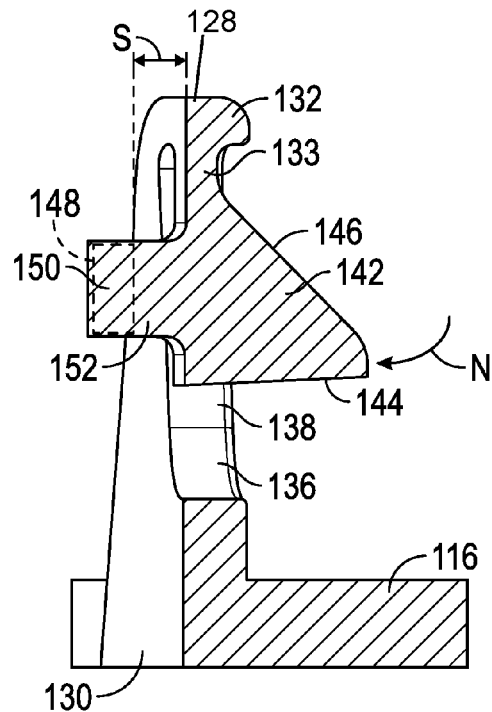
FIG. 4A is a schematic, cross-sectional, fragmentary view of the clip shown in FIG. 1, taken along section line 4-4 of FIG. 3, wherein the clip has a restrictor disposed in a first restrictor position.

Referring to the drawings, wherein like reference numbers correspond to like or similar components throughout the several figures, and beginning with FIG. 1 that schematically illustrates a coupling assembly 100. The coupling assembly 100 may be part of a vehicle 101. The vehicle 101 may be a land vehicle, such as a car or a truck, or another type of vehicle, such as an airplane or a boat. The coupling assembly 100 may also be used in non-vehicular applications.

The coupling assembly 100 includes a panel 102 and a clip 104 coupled to the panel 102. The clip 104 can also be coupled to another object, such as a vehicular body part, in order to couple that object to the panel 102 through the clip 104. The panel 102 is wholly or partly made of a substantially rigid material, such as a rigid metal, and includes a panel body 106, which may have a planar shape in order to minimize cost. The panel body 106 defines a first panel surface 108 and a second panel surface 110 opposite the first panel surface 108. The panel 102 has a panel hole 112, such as a thru-hole, extending through the panel body 106. The panel hole 112 extends through the first panel surface 108 and the second panel surface 110. The panel body 106 has an inner panel surface 114 defining the panel hole 112. The inner panel surface 114 may have a circumferential shape (e.g., circular shape) in order to receive the clip 104. Because of the circumferential shape of the inner panel surface 114, the panel hole 112 may have a circumferential shape (e.g., circular shape) that helps minimize manufacturing costs.

With reference to FIGS. 1 and 2, the clip 104 is wholly or partly made of a resilient material, such as a resilient metal or resilient polymer, and can be coupled to the panel 102 and includes a clip base 116 abutting the panel body 106. Specifically, the clip base 116 may be isolated from the first panel surface 108 by a compliant material that is compresses between the base 116 and the first panel surface 108. This compliant interface generates an axial force that maintains contact between the clip 104 and the panel 102. The clip base 116 may have an annular shape to allow another object, such as a rod, to extend through the clip 104 and the panel hole 112 of the panel 102. As such, the clip base 116 has an annular body 118, which has an outer body surface 120 and an inner body surface 122 opposite the outer body surface 120. The inner body surface 122 defines a clip opening 124 (e.g., a thru-hole). The clip opening 124 may have a circular shape. The clip base 116 has an annular shape and the outer body surface 120 is radially spaced apart from the inner body surface 122 along a radial direction R. The clip base 116 has a center C, which is located in the panel hole 112. The inner body surface 122 faces toward the center C defined by the clip base 116, and the outer body surface 120 faces away from the center C defined by the clip base 116.

The clip 104 further includes a plurality of retainers 126 coupled along the clip base 116. Although the depicted embodiment shows four retainers 126, the clip 104 may include more or fewer retainers 126. Irrespective of the quantity, the retainers 126 extend through the panel hole 112 in order to couple the clip 104 to the panel 102. The retainers 126 are arranged annularly around the center C defined by the clip base 116, thereby facilitating the connection between the panel 102 and the clip 104. In the depicted embodiment, the retainers 126 are directly coupled to clip base 116 along the inner body surface 122 and protrude from the clip base 116 in an axial direction A, which is perpendicular to the radial direction R.

With reference to FIGS. 2 and 3, each retainer 126 includes a frame 128 directly coupled to the clip base 116. In the depicted embodiment, each frame 128 has a trapezoidal shape in order to enhance its structural integrity. Each frame 128 has a first end portion 130 directly coupled to the clip base 116 and a second end portion 132 opposite the first end portion 130. The second end portion 132 extends along an axis of rotation X as discussed in detail below. In other words, the second end portion 132 has a living hinge 133 that defines the axis of rotation X. Each frame 128 is cantilevered from the clip base 116. As such, the second end portion 132 of the frame 128 is not directly coupled to the clip base 116. Rather, the second end portion 132 is coupled to the clip base 116 only through the first end portion 130 of the frame 128. In particular, the first end portion 130 of the frame 128 is directly coupled to the inner body surface 122 of the annular body 118 (see FIG. 2) in order to simplify the manufacturing process of the clip 104.

The frame 128 includes a frame body 134 and a frame opening 136 (e.g., thru-hole) extending through the frame body 134. The frame body 134 has an inner frame surface 138, which defines the frame opening 136, and an outer frame surface 140 opposite the inner frame surface 138. The outer frame surface 140 defines the substantially trapezoidal shape of the frame 128 in order to enhance the structural integrity of the frame 128. The frame opening 136 may also have a substantially trapezoidal shape in order to enhance the structural integrity of the frame 128. The frame 128 has a first frame surface 129 and a second frame surface 131 opposite the first frame surface 129. The first frame surface 129 faces away from the center C (FIG. 1) of the clip 104, and the second frame surface 131 faces toward the center C of the clip base 116. The frame opening 136 extends through the first frame surface 129 and the second frame surface 131.

With reference to FIGS. 3 and 4A, each retainer 126 includes an overhang 142 rotatably coupled to the frame 128. Specifically, the overhang 142 is rotatably coupled to the second end portion 132 of the frame 128 and can therefore rotate relative to the frame 128 about the axis of rotation X. The frame opening 136 partially receives the overhang 142 in order to allow the overhang 142 to rotate freely relative to the frame 128. In other words, the overhang 142 is partially disposed in the frame opening 136. Further, the overhang 142 includes an abutment surface 144 and a ramp 146 connected to the abutment surface 144. The ramp 146 is obliquely angled relative to the abutment surface 144 in order to facilitate insertion of the retainers 126 through the panel hole 112. The abutment surface 144 can abut the second panel surface 110 (FIG. 1) once the retainers 126 have been inserted through the panel hole 112 in order to couple the clip 104 to the panel 102.

Each retainer 126 additionally includes a restrictor 148 directly coupled to the overhang 142. A beam 152 may interconnect the overhang 142 and the restrictor 148. The overhang 142, the beam 152, and the restrictor 148 may collectively form a one-piece structure. In the depicted embodiment, the restrictor 148 is configured as tab 150. Regardless of its configuration, the restrictor 148 is wholly or partly made of a resilient material, such as a resilient polymeric material, in order to allow the restrictor 148 to bend upon application of a force and return to its original configuration upon release of that force. The restrictor 148 may have a trapezoidal shape in order to enhance its structural integrity. Accordingly, the tab 150 may have a trapezoidal shape. The entire restrictor 148 is closer to the second frame surface 131 than the first frame surface 129.

The restrictor 148 protrudes from the overhang 142 toward the center C (FIG. 1) of the clip 104, and some portions of the restrictor 148 extend beyond the inner frame surface 138 defining the frame opening 136. As such, the restrictor 148 is partially disposed behind the frame body 134. Specifically, in the depicted embodiment, the restrictor 148 includes a first restrictor portion 154, a second restrictor portion 156 opposite the first restrictor portion 154, and a third restrictor portion 158 directly interconnecting the first restrictor portion 154 and the second restrictor portion 156. The first restrictor portion 154 and the second restrictor portion 156 extend beyond the inner frame surface 138 such that the first restrictor portion 154 and the second restrictor portion 156 are disposed behind the frame body 134.

Figure 4B:
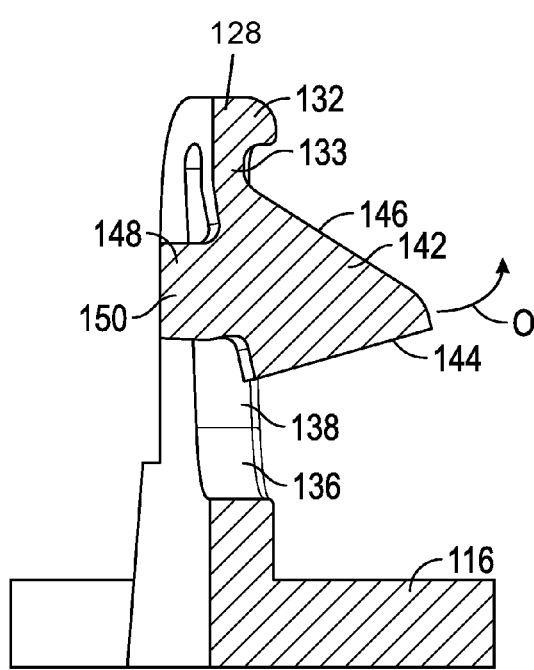
FIG. 4B is a schematic, cross-sectional, fragmentary view of the clip shown in FIG. 1, taken along section line 4-4 of FIG. 3, wherein the clip has a restrictor disposed in a second restrictor position.

With reference to FIGS. 4A and 4B, the restrictor 148 can move relative to the frame 128 between a first restrictor position (FIG. 4A) and a second restrictor position (FIG. 4B). The motion of the restrictor 148 between the first restrictor position (FIG. 4A) and the second restrictor position (FIG. 4B) may entail bending. In particular, the first restrictor portion 154 and the second restrictor portion 156 may bend as the restrictor 148 rotates relative to the frame 128 about the axis of rotation X (FIG. 3) upon application or release of a withdrawal force W (FIG. 1), because the first restrictor portion 154 and the second restrictor portion 156 would be pressing against the frame 128. In the first restrictor position (FIG. 4A), the restrictor 148 is spaced apart from the frame 128 by a distance S. In other words, the restrictor 148 is not in direct contact with the frame 128 when the restrictor 148 is in the first restrictor position (FIG. 4B). The restrictor 148 is normally in the first restrictor position. In the second restrictor position (FIG. 4B), the restrictor 148 is in direct contact with the frame 128, thereby inhibiting the clip 104 from decoupling from the panel 102. Specifically, the direct contact of the restrictor 148 and the frame 128, when the restrictor 148 is in the second restrictor position, limits further rotation of the overhang 142 in an outward direction O (FIG. 4B).

Figure 5:
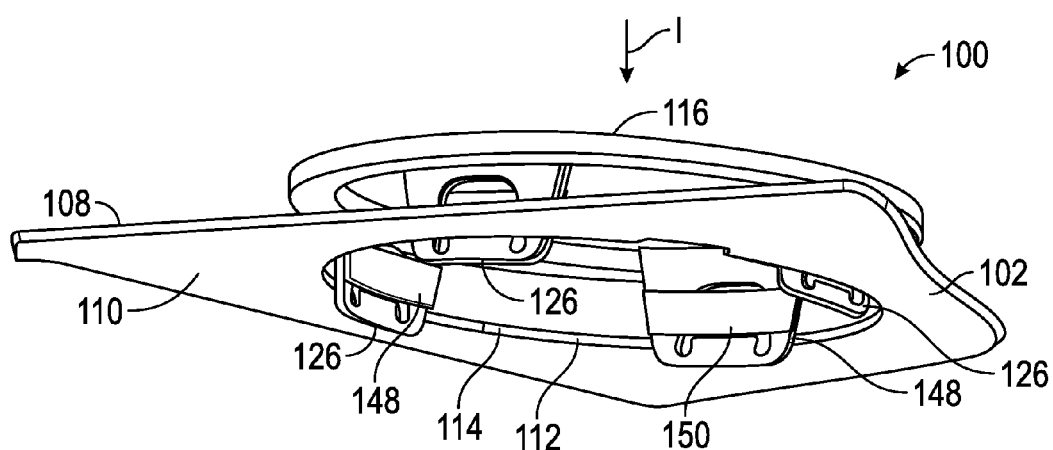
FIG. 5 is a schematic, perspective view of the coupling assembly shown in FIG. 1, wherein the clip is being inserted through the panel.

With reference to FIG. 5, to couple the clip 104 to the panel 102, an insertion force I is applied to the clip 104 in order to insert the retainers 126 through the panel hole 112 of the panel 102. As the retainers 126 move through the panel hole 112, the overhangs 142 rotate toward the center C of the clip 104, thereby allowing the ramps 146 (FIG. 4A) to slide along the inner panel surface 114. The insertion force I is continuously applied to the clip 104 until the abutment surface 144 (FIG. 4A) of the overhang 142 is in direct contact with the first panel surface 108

With reference to FIG. 1, once the abutment surface 144 (FIG. 4A) of the overhang 142 is in direct contact with the second panel surface 110, the clip 104 is secured to the panel 102. At this juncture, the clip base 116 is in direct contact with the first panel surface 108 in order to help secure the clip 104 to the panel 102.

When a withdrawal force W is applied to the clip 104 in order to attempt to decouple the clip 104 from the panel 102, the overhangs 142 rotates relative to the frame 128 in an outward direction O (FIG. 4B). As a consequence, the restrictors 148 move toward the frame 128 from the first retainer position (FIG. 4A) to the second retainer position (FIG. 4B). Once in the second retainer position (FIG. 4B), the retainers 126 contact the frame 128 in order to hinder further movement (e.g., rotation) of the overhang 142 in the outward direction O. As a result, the restrictors 148 help maintain the abutment surface 144 in direct contact with the second panel surface 110 of the panel 102 and inhibit the clip 104 from decoupling from the panel 102 when the restrictor 148 contacts and presses against the frame 128. Once the withdrawal force W is released from the clip 104, the overhang 142 rotates relative to the frame 128 in an inward direction N (FIG. 4A), causing the restrictor 148 to return to its first restrictor position. As discussed above, in the first restrictor position, the restrictor 148 is spaced apart from the frame 128 and is not in direct contact with the frame 128.

While the best modes for carrying out the teachings have been described in detail, those familiar with the art to which this disclosure relates will recognize various alternative designs and embodiments for practicing the teachings within the scope of the appended claims.

The invention claimed is:

1. A coupling assembly, comprising:
   a panel having a panel hole;
   a clip including a clip base and a plurality of retainers coupled along the clip base, wherein the plurality of retainers extend through the panel hole, and each retainer includes:
      a frame coupled to the clip base, wherein the frame defines a first end portion and a second end portion opposite the first end portion, the first end portion is coupled to the clip base, and the second end portion defines an axis of rotation;
      an overhang rotatably coupled to the second end portion such that the overhang is rotatable relative to the frame about the axis of rotation;
      a restrictor coupled to the overhang such that the restrictor is rotatable relative to the frame between a first restrictor position and a second restrictor position, wherein, in the first restrictor position, the restrictor is spaced apart from the frame, and in the second restrictor position, the restrictor is in direct contact with the frame;
   wherein the restrictor is movable from the first restrictor position to the second restrictor position when a withdrawal force is applied to the clip; and
   wherein, in the second restrictor position, the restrictor contacts the frame in order to inhibit rotation of the overhang relative to the frame, thereby inhibiting the clip from decoupling from the panel.

2. The coupling assembly of claim 1, wherein the second end portion is not directly coupled to the clip base.

3. The coupling assembly of claim 2, wherein the frame is cantilevered from the clip base such that the second end portion is coupled to the clip base only through the first end portion.

4. The coupling assembly of claim 1, wherein the clip base has a center, the frame defines a first frame surface and a second frame surface opposite the first frame surface, the first frame surface faces away from the center, the second frame surface faces toward the center, and the restrictor is closer to the second frame surface than the first frame surface.

5. The coupling assembly of claim 4, wherein the restrictor protrudes from the overhang toward the center of the clip base.

6. The coupling assembly of claim 4, wherein the frame includes a frame body and a frame opening extending through the first frame surface and the second frame surface, and the overhang is partially disposed in the frame opening.

7. The coupling assembly of claim 6, wherein the frame opening has a substantially trapezoidal shape.

8. The coupling assembly of claim 7, wherein the frame defines an inner frame surface, the inner frame surface defines the frame opening, and the restrictor extends beyond the inner frame surface.

9. The coupling assembly of claim 8, wherein the restrictor includes a first restrictor portion, a second restrictor portion, and a third restrictor portion interconnecting the first restrictor portion and the second restrictor portion, the first and second restrictor portions are coupled to the overhang only through the third restrictor portion, the first restrictor portion extends beyond the inner frame surface, and the second restrictor portion extends beyond the inner frame surface.

10. The coupling assembly of claim 1, wherein the restrictor is not in contact with the frame when the restrictor is in the first restrictor position relative to the frame.

11. The coupling assembly of claim 1, wherein the panel includes a panel body, the panel body defines a first panel surface and a second panel surface opposite the first panel surface, and the panel hole extends through the panel body from the first panel surface to the second panel surface, and the clip base is in direct contact with the first panel surface.

12. The coupling assembly of claim 11, wherein each of the overhangs is in direct contact with the second panel surface.

13. The coupling assembly of claim 1, wherein each of the frames has a substantially trapezoidal shape.

14. The coupling assembly of claim 1, wherein the clip base has an annular body, the annular body has an outer body surface and an inner body surface opposite the outer body surface, and the inner body surface defines a clip opening, and each of the first end portions of the frames is directly coupled to the inner body surface.

15. A clip, comprising:
   a clip base and a plurality of retainers coupled along the clip base, wherein each retainer includes:
      a frame coupled to the clip base, wherein the frame defines a first end portion and a second end portion opposite the first end portion, the first end portion is coupled to the clip base, and the second end portion defines an axis of rotation;
      an overhang rotatably coupled to the second end portion such that the overhang is rotatable relative to the frame about the axis of rotation;
      a restrictor coupled to the overhang such that the restrictor is rotatable relative to the frame between a first restrictor position and a second restrictor position, wherein, in the first restrictor position, the restrictor is spaced apart from the frame, and in the second restrictor position, the restrictor is in direct contact with the frame;
   wherein the restrictor is movable from the first restrictor position to the second restrictor position when a withdrawal force is applied to the clip; and
   wherein, in the second restrictor position, the restrictor contacts the frame in order to inhibit rotation of the overhang relative to the frame.

16. The clip of claim 15, wherein the second end portion is not directly coupled to the clip base.

17. The clip of claim 16, wherein the frame is cantilevered from the clip such that the second end portion is coupled to the clip base only through the first end portion.

18. The clip of claim 15, wherein the clip base has a center, the frame defines a first frame surface and a second frame surface opposite the first frame surface, the first frame surface faces away from the center, the second frame surface faces toward the center, and the restrictor is closer to the second frame surface than the first frame surface.

19. The clip of claim 18, wherein the restrictor protrudes from the overhang toward the center of the clip base.

20. A vehicle, comprising:
- a panel including a panel body, wherein the panel body defines a first panel surface and a second panel surface opposite the first panel surface, and the panel has a panel hole extending through the panel body from the first panel surface to the second panel surface;
- a clip including a clip base and a plurality of retainers coupled along the clip base, wherein the clip base is in direct contact with the first panel surface, the plurality of retainers extend through the panel hole, and each retainer includes:
  - a frame coupled to the clip base, wherein the frame defines a first end portion and a second end portion opposite the first end portion, the first end portion is coupled to the clip base, and the second end portion defines an axis of rotation;
  - an overhang rotatably coupled to the second end portion such that the overhang is rotatable relative to the frame about the axis of rotation, wherein the overhang is in direct contact with the second panel surface;
  - a restrictor coupled to the overhang such that the restrictor is rotatable relative to the frame between a first restrictor position and a second restrictor position, wherein, in the first restrictor position, the restrictor is spaced apart from the frame, and in the second restrictor position, the restrictor is in direct contact with the frame;
- wherein the restrictor is movable from the first restrictor position to the second restrictor position when a withdrawal force is applied to the clip; and
- wherein, in the second restrictor position, the restrictor contacts the frame in order to inhibit rotation of the overhang relative to the frame, thereby inhibiting the clip from decoupling from the panel.

* * * * *